United States Patent
Wise et al.

(10) Patent No.: US 8,233,438 B2
(45) Date of Patent: *Jul. 31, 2012

(54) METHODS AND APPARATUS FOR DYNAMICALLY ADJUSTING A DATA PACKET WINDOW SIZE FOR DATA PACKET TRANSMISSION IN A WIRELESS COMMUNICATION NETWORK

(75) Inventors: Simon Tyler Wise, Waterloo (CA); Marc Plumb, Waterloo (CA); Ian M. Patterson, Waterloo (CA); Allan David Lewis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,711

(22) Filed: Nov. 4, 2010

(65) Prior Publication Data

US 2011/0051637 A1  Mar. 3, 2011

Related U.S. Application Data

(63) Continuation of application No. 11/536,874, filed on Sep. 29, 2006, now Pat. No. 7,869,395.

(60) Provisional application No. 60/722,852, filed on Sep. 30, 2005.

(51) Int. Cl.
*H04W 4/00* (2009.01)
*H04B 7/00* (2006.01)
(52) U.S. Cl. .......................... 370/328; 370/338
(58) Field of Classification Search .................. 370/328, 370/338
See application file for complete search history.

(56) References Cited

U.S. PATENT DOCUMENTS

| 5,193,151 | A | * | 3/1993 | Jain ................................ 709/237 |
| 5,727,002 | A | | 3/1998 | Miller et al. |
| 6,646,987 | B1 | | 11/2003 | Qaddoura |
| 6,707,869 | B1 | | 3/2004 | Zhang |
| 6,901,081 | B1 | | 5/2005 | Ludwig |

(Continued)

FOREIGN PATENT DOCUMENTS

EP  1613002 A1  1/2006

(Continued)

OTHER PUBLICATIONS

Sally Floyd, "Congestion Control for High-Bandwidth-Delay-Product-Networks: XCP vs. Highspeed TCP and Quickstart", Sep. 11, 2002, pp. 1-20, ICIR.

(Continued)

*Primary Examiner* — Nathan Mitchell
(74) *Attorney, Agent, or Firm* — John J. Oskorep, Esq.

(57) ABSTRACT

A router is operative to perform the following actions for each one of a plurality of wireless devices operating in a wireless network. The router initially transmits a number of data packets matched for a window size which corresponds to a default window size. The router then measures a round trip time (RTT) associated with communication of each of the transmitted packets. The router increases the window size if the RTT associated with the communication of each of the transmitted packets is within a first threshold. On the other hand, the router decreases the window size if the RTT associated with the communication of any of the transmitted packets is more than the first threshold but less than a second threshold. The router sets or updates at least one of the first or the second thresholds based on traffic communicated to the plurality of wireless devices via the router.

27 Claims, 5 Drawing Sheets

U.S. PATENT DOCUMENTS

| | | | |
|---|---|---|---|
| 7,075,890 B2 * | 7/2006 | Ozer et al. | 370/230 |
| 7,154,868 B1 | 12/2006 | Sharma et al. | |
| 7,382,749 B2 * | 6/2008 | Yam | 370/331 |
| 7,609,641 B2 * | 10/2009 | Strutt et al. | 370/238 |
| 7,765,294 B2 * | 7/2010 | Edwards et al. | 709/224 |
| 7,869,395 B2 * | 1/2011 | Wise et al. | 370/328 |
| 2002/0146037 A1 | 10/2002 | Sugaya et al. | |
| 2002/0154602 A1 * | 10/2002 | Garcia-Luna-Aceves et al. | 370/230 |
| 2003/0035420 A1 | 2/2003 | Niu | |
| 2004/0151113 A1 * | 8/2004 | Zakrzewski | 370/230 |
| 2005/0068911 A1 * | 3/2005 | Miyake et al. | 370/299 |
| 2005/0157696 A1 * | 7/2005 | Yamamoto | 370/349 |
| 2005/0286416 A1 * | 12/2005 | Shimonishi et al. | 370/229 |
| 2006/0133281 A1 * | 6/2006 | Witherell et al. | 370/238 |
| 2007/0025301 A1 | 2/2007 | Petersson et al. | |
| 2007/0076626 A1 | 4/2007 | Wise et al. | |
| 2008/0049624 A1 * | 2/2008 | Ray et al. | 370/241 |
| 2008/0212604 A1 * | 9/2008 | Liu | 370/448 |

FOREIGN PATENT DOCUMENTS

| | | |
|---|---|---|
| WO | 0150637 A1 | 7/2001 |
| WO | 03043258 | 5/2003 |
| WO | 03043258 A1 | 5/2003 |
| WO | 2004010657 A1 | 1/2004 |
| WO | 2005002148 A1 | 1/2005 |
| WO | 2006117644 A1 | 11/2006 |

OTHER PUBLICATIONS

International Search Report for PCT application # PCT/CA2006/001605, Jan. 26, 2007.

International Preliminary Report on Patentability for International Patent Application PCT/CA2006/001605, Apr. 1, 2008.

Srisankar S. Kunniyur, "AntiECN Marking: A Marking Scheme for High Bandwidth Delay Connections", May 2003, pp. 1-12.

Sally Floyd, "Highspeed TCP for Large Congestion Windows", Internet Engineering Task Force, Aug. 2002, pp. 1-24, ICSI.

Sally Floyd, "Limited Slow-Start for TCP With Large Congestion Windows", Internet Engineering Task Force, Aug. 2002, pp. 1-6, ICSI.

Floyd et al., "Modifying TCP's Congestion Control for High Speeds", May 5, 2002, pp. 1-5.

Brakmo et al., "TCP Vegas: End-to-End Congestion Avoidance on a Global Internet", pp. 1-22, vol. 13, No. 8, Oct. 1995, University of Arizona, Tucson, AZ 85721.

Nabeshima et al. "Improving the Convergence Time of Highspeed TCP", NTT Cyber Solutions Laboratories, Nov. 16, 2004, NTT Corporation, Japan.

John Nagle, "Congestion Control IP/TCP Inter Networks", Jan. 6, 1984, pp. 1-10, Network Working Group.

Handley et al., "TCP Congestion Window Validation", pp. 1-11, Network Working Group, Jun. 2000.

S. Floyd, "Congestion Control Principles", pp. 1-17, Network Working Group, Sep. 2000.

Wennstrom et al., "TCP Over Wireless Networks", pp. 1-34, Mar. 26, 2008.

Katabi et al., "Congestion Control for High Bandwidth-Delay Product Networks", Sigcomm '02, pp. 1-14, Aug. 19, 2002, Pittsburgh, Pennsylvania, USA.

Venkataramani et al., "TCP Nice: A Mechanism for Background Transfers", 5th Symposium on Operating Systems Design and Implementation, pp. 329-343, XP-002412375, USENIX Association, Jan. 2002.

Saikia et al., "Packet Loss Free Congestion Control in TCP for Controlled Packet Latency and Optimal Throughput", TENCON 2003 Conference on Convergent Technologies for Asia-Pacific Region, pp. 313-317, Oct. 15, 2003.

Chen et al., "An End-To-End Flow Control Approach Based on Round Trip Time", pp. 1537-1547, Mar. 23, 2000, Elsevier Science B.V.

European Search Report for EP patent application # 06790769.1, Mar. 5, 2009.

Brakmo et al., "TCP Vegas: New Techniques for Congestion Detection and Avoidance", pp. 1-12, Oct. 4, 1994, University of Arizona, Tucson, AZ 85721.

* cited by examiner

METHODS AND APPARATUS FOR DYNAMICALLY ADJUSTING A DATA PACKET WINDOW SIZE FOR DATA PACKET TRANSMISSION IN A WIRELESS COMMUNICATION NETWORK

CROSS-REFERENCE TO RELATED APPLICATIONS

This patent application is a continuation of and claims priority to U.S. non-provisional patent application Ser. No. 11/536,874 having a filing date of 29 Sep. 2006, now U.S. Pat. No. 7,869,395, which claims priority to a U.S. provisional patent application having application No. 60/722,852 and filing date of 30 Sep. 2005, each application being hereby incorporated by reference herein.

BACKGROUND

1. Field of the Technology

The present disclosure generally relates to a wireless communication system, and more specifically to a system and a method for adaptively adjusting window sizing for datagram delivery to a wireless mobile device based upon a round trip time of the datagram in the wireless communication system.

2. Description of the Related Art

In a wireless communication network, the rate at which data can be transferred to a wireless mobile communication device ("mobile device") from a client depends upon various factors such as the quality of the mobile device coverage, the type of network in which the mobile device is currently registered and located, network congestion, and the type of the mobile device. Various types of mobile devices with various capabilities may access a common wireless network, or a common wireless transport for web browsing. For example, an old Global System for Mobile Communications ("GSM") compatible mobile device may share the same GSM wireless communication network with a faster data rate capable mobile device such as an Enhanced Data rates for Global Evolution ("EDGE") device and a General Packet Radio Service ("GPRS") capable mobile device.

An old Code Division Multiple Access ("COMA") mobile device, may share the same COMA wireless communication network with a new device having the EVolution Data Only, or Optimized, ("EV-DO") enhancement. To accommodate mobile devices having various capabilities, the date rate used for a given wireless transport may be fixed a maximum rate which meets the requirements for the slowest device. However, such a rate wastes the capabilities of faster mobile devices and may be perceived as slow web browsing by the users of the faster mobile devices. Sending more data to mobile devices at faster rates than they are designed to handle can also create problems for the mobile devices and the network.

DETAILED DESCRIPTION OF THE PREFERRED EMBODIMENTS

Figure 1:
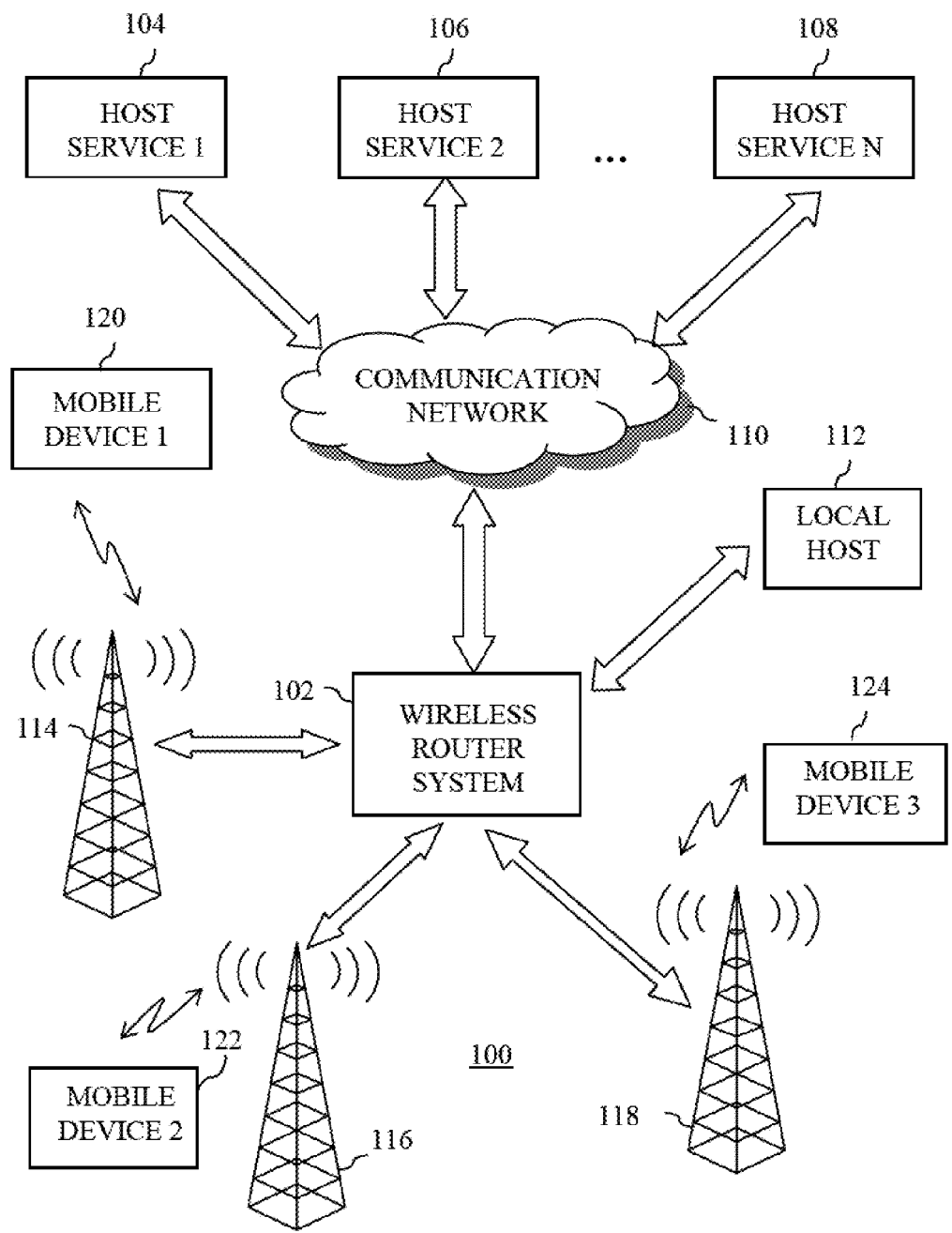
FIG. 1 is an exemplary wireless communication system in which a wireless router system having the adaptive window feature in accordance with at least one of the preferred embodiments may be practiced.

Methods and apparatus for dynamically adjusting a data packet window size for data packet transmission in a wireless communication network are described herein. In one illustrative example, a method in a wireless router system for transmitting data packets to a mobile communication device through the wireless communication network based upon a round trip time (RTT) associated with communication of each data packet is provided. The round trip time is a time period between the transmission of each data packet and reception of a corresponding acknowledgment signal from the mobile communication device. Initially, a number of data packets matched for a window size are transmitted to the mobile communication device, and a round trip time associated with communication of each of the transmitted data packets is measured. The window size for data packet transmission is re-sized by increasing the window size if the round trip time associated with the communication of each of the transmitted data packets is within a first time threshold, and decreasing the window size if the round trip time associated with the communication of any of the transmitted data packets is more than the first time threshold but less than a second time threshold. The window size is also decreased if the round trip time of any of the transmitted data packets is more than the second time threshold, where each such data packet is further marked as a lost data packet. A number of data packets matched for the re-sized window is subsequently transmitted, including a retransmission any data packets marked as lost. The steps of the method are repeated from the measuring step until data packets to be transmitted are exhausted.

The adaptive window techniques of the present disclosure allow newer mobile devices with higher data-rate capabilities, such as EDGE-capable mobile devices, to browse the web quickly while ensuring that older mobile devices with lower data-rate capabilities are not overwhelmed. The adaptive window techniques are designed to dynamically adjust the rate of data transfer from a wireless router system to a wireless mobile communication device ("mobile device") based upon an overall network traffic condition, including the quality of the mobile device coverage, the type of network in which the mobile device is currently registered and located, network congestion, and the type of the mobile device.

According to the present disclosure, a technique is provided which dynamically adjusts the number of data packets transmitted to the mobile device at one time, or the window size, based upon a round trip time (RTT) associated with the data packets. The mobile device may transmit an acknowledgment signal for every packet received individually. If the mobile device supports optimized acknowledgments, it does not transmit an acknowledgment signal for each packet, but instead transmits an acknowledgment signal upon receiving a set of data packets. The wireless router system measures the round trip time as the time period between the transmission of the data packets and the receipt of the acknowledgment signal. The round trip time is indicative of the overall network traffic condition. The wireless router system initially transmits a default number of data packets, matching a default window size, to the mobile device, and measures the round trip times associated with those data packets.

Adjustment of the window size is made based on the round trip time of the communication of the data packets. If the round trip time is less than a first time threshold for those data packets, then the window size is increased, allowing more data packets to be transmitted. If the round trip time is more than the first time threshold but less than a second time threshold, then the window size is decreased, allowing less data packets to be transmitted to avoid losing data packets. If the round trip time is more than the second time threshold time, then the data packets having such round trip time are considered lost. The window size is decreased, and the lost packets are re-transmitted within the decreased window size. The transmission of data packets matching the window size and the re-sizing of the window size based upon the round trip time are repeated until all data packets have been transmitted. The window size is increased until a predetermined maximum window size is reached. If a new set of data becomes available for transmission to the same mobile device within a predetermined interval after all previous data packets have been transmitted, the last-used window size is retained for the initial data packet transmission. However, if new set of data becomes available after the predetermined interval after all previous data packets have been transmitted, the default window size is used for the initial data packet transmission.

As will become apparent, the present techniques advantageously utilize what may be referred to as an "in-flight" window (rather than a sliding window which may be utilized in some TCP communications) suitable for the present wireless environment and data applications. A sliding window approach of the prior art may be useful where a stream of data is being communicated, and a first byte needs to be received before a second byte is useful (e.g. a streaming video). The sliding window approach may also be useful where a very large file is being communicated and the receiver does not have sufficient memory available to buffer all of the data (e.g. downloading a new program). With a sliding window approach, if the permitted window size is three (3), the sender is allowed to send packets 1, 2, 3. If packet 1 is acknowledged, the sender is permitted to send packet 4. However, if packet 2 is acknowledged before packet 1, the sender is not permitted to send any other following packet until packet 1 is acknowledged.

Using the "in-flight" window approach of the present disclosure, as long as any one of the packets 1, 2, or 3 is acknowledged, the sender is permitted to send another packet to the match the number of packets "in-flight". In the present environment, several different small independent messages (e.g. small incremental changes in data for data-synchronized communication with network applications, e-mail messages/data, calendar appointment message/data) may be sent at the same time, and the mobile device is able receive (and display, for example) a second message before it receives a first message. By using an in-flight window, a more efficient use of the communication channel is utilized, as all other communications are not halted while the first message (for example) is being resent.

In addition, an advantage conferred by using a fixed value for the round trip time is that it helps identify the optimal sending rate more quickly, since a large amount of traffic does not have to be sent first in order to calculate a good estimate of the minimum round trip time. The technique is particularly useful when the mobile device is operative to send, over a long period of time, a plurality of relatively short data bursts/messages (e.g. small incremental changes in data for data-synchronized communication with network applications, e-mail messages/data, calendar appointment message/data) with long periods of idle connections between each sending. Another advantage of using a fixed value for the optimal round trip time is that more consistent sharing of the bandwidth is gained across different connections. Finally, in accordance with the present techniques, the previous window size is retained for a predetermined time period (e.g. several minutes, such as between 1 and 10 minutes) and may be returned to more quickly. This technique is driven on the assumption that the limit in bandwidth is the RF over-the-air portion, which has less to do with other traffic (which may change quickly) and more to do with where the mobile device is located (which does not change too quickly). According to the prior art (e.g. TCP variant), the minimum round trip time would need to be re-learned each time a short message had to be sent. Also, the sender of the prior art techniques drops the window size back to one (1) segment as the technique assumes that another device may now be using the network bandwidth. Therefore, the sender is not permitted to quickly start sending data at a fast data rate.

FIG. 1 is an exemplary wireless communication system 100 in which a wireless router system 102 having the adaptive window feature in accordance with at least one of the preferred embodiments may be practiced. The wireless communication system 100 includes a plurality of host services (three shown, 104, 106, and 108), each of which may have a plurality of services such as, but not limited to, e-mail, calendar, Internet web browser, and other applications, available to subscribers. The host services 104, 106, and 108 are connected to a communication network 110 such as Internet, which connects to the wireless router system 102 allowing communication between the host services 104, 106, and 108 and the wireless router system 102. The wireless router system 102 may also be connected to a host service, such as a local service 112, without the communication network 110.

The wireless router system 102 of FIG. 1 is also connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, a two-way paging network, a short range wireless network such as Bluetooth™ and IEEE 802.11 compliant network, and others alike, and the mobile devices 120, 122, and 124 are mobile devices compatible with the corresponding wireless network.

Figure 2:
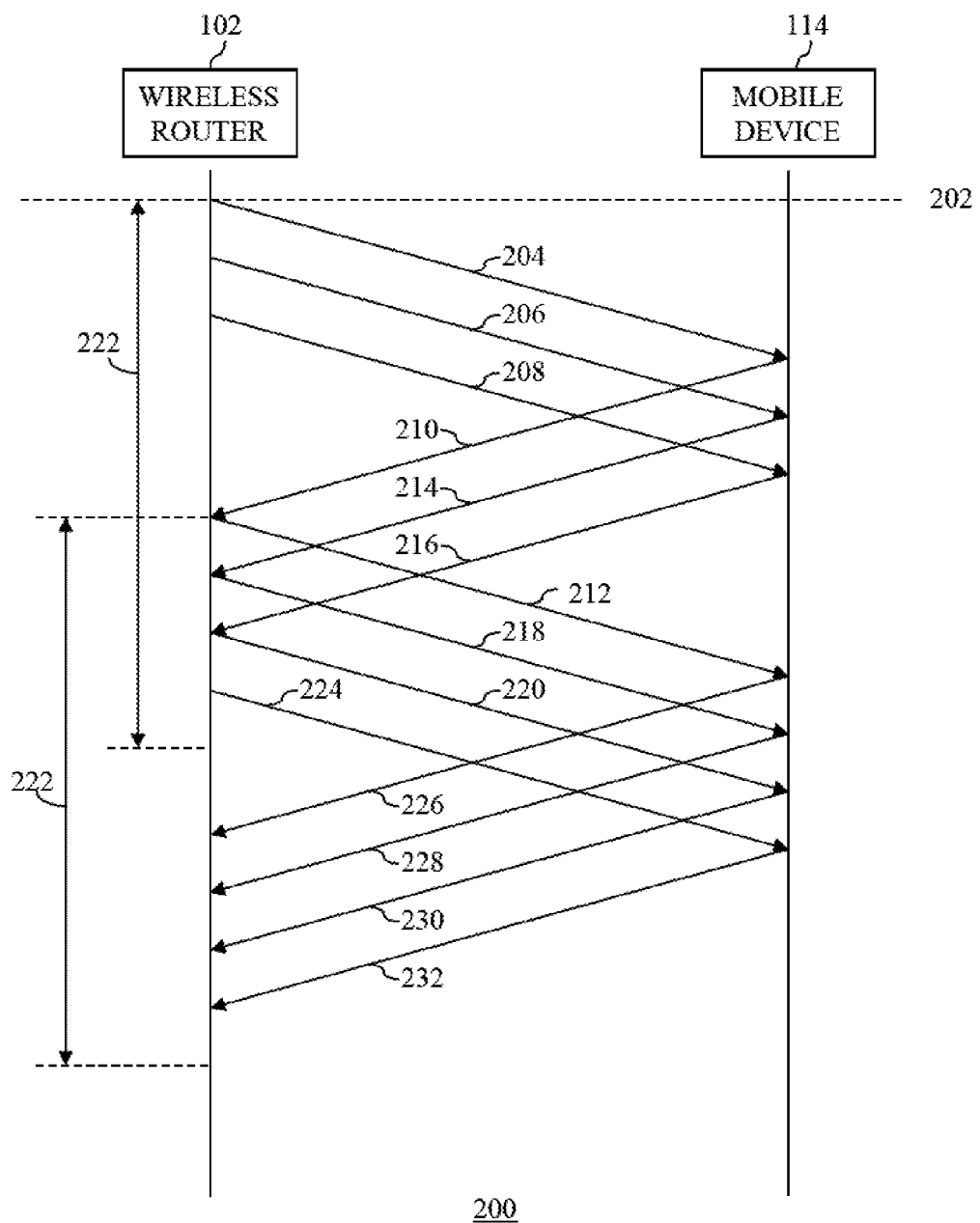
FIG. 2 is an exemplary timing diagram for the adaptive window with an increase in the window size for data packet transmissions set between the wireless router system and the mobile device in accordance with at least one of the preferred embodiments.

FIG. 2 is an exemplary timing diagram 200 which reveals an increase in the window size for data packet transmissions between the wireless router system 102 and the mobile device 120 utilizing techniques of at least one of the preferred embodiments. In this example, the initial window size, which is also the minimum window size, is set to three data packets, the window size increment is set to one data packet, the maximum window size is set to five data packets, and the mobile device 120 transmits an acknowledgment signal for each packet received. At time 202, the wireless router system 102 begins to transmit the first set of data packets 204, 206, and 208, to the mobile device 120. As soon as the wireless router system 102 receives the first acknowledgment signal 210, which corresponds to data packet 204, it transmits next data packet 212, thereby keeping the number of "packets in flight" equal to three.

Subsequently in FIG. 2, the wireless router system 102 receives acknowledgment signals 214 and 216 corresponding to data packets 206 and 208, and transmits data packets 218 and 220. Because the round trip time for each of the first set of data packets 204, 206, and 208 is less than a first time threshold 222, the window size for the packets in flight is increased to four data packets, and the wireless router system transmits data packet 224 after data packet 220. The wireless router system 102 then receives corresponding acknowledgment signals 226, 228, 230, and 232 within the first time threshold 222. Although not shown in FIG. 2, because the round trip time for each of the four data packets is again less than the first time threshold 222, the window size would be increased to five data packets if more data packets were available. The wireless router system 102 would have transmitted four data packets in response to receiving each of the acknowledgment signals 226, 228, 230, and 232, and in addition, would have transmitted another data packet.

Figure 3:
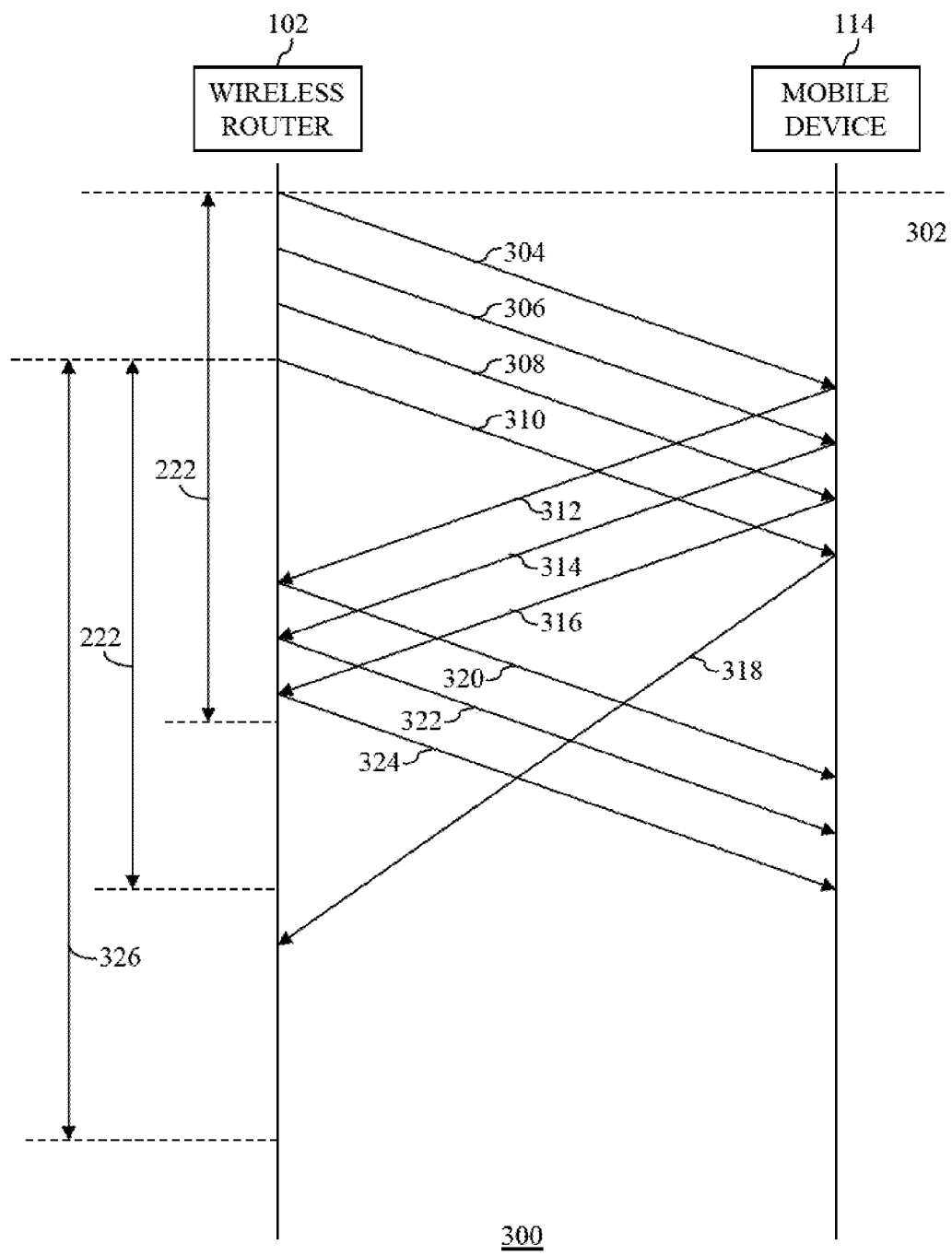
FIG. 3 is an exemplary timing diagram for the adaptive window with a decrease in the window size for data packet transmissions between the wireless router system and the mobile device in accordance with at least one of the preferred embodiments.

FIG. 3 is an exemplary timing diagram 300 which reveals a decrease in the window size for data packet transmissions between the wireless router system 102 and the mobile device 120 when utilizing techniques of at least one of the preferred embodiments. In this example, all the conditions are the same as the example in FIG. 2. The wireless router system 102 has the window size set to four data packets. At time 302, the wireless router system 102 begins to transmit the four data packets 304, 305, 308, and 310, to the mobile device 120. The mobile device 120 then transmits corresponding acknowledgment signal 312, 314, 316, and 318. As described previously, the wireless router system 102 transmits data packet 320, 322, and 324 in response to receiving the acknowledgment signal 312, 314, and 316 within the first time threshold. However, because the round trip time for data packet 310 is greater than the first time threshold 222, the window size is decreased to three data packets.

A second time threshold is also shown in FIG. 3 as measured against data packet 310 and the corresponding acknowledgment signal 318. Data packets having round trip times longer than the second time threshold are considered to be lost, and are re-transmitted. Instead of actually measuring the time period longer than the second time threshold, the wireless router system 102 may consider a data packet to be lost if it fails to receive an acknowledgement signal corresponding to the data packet within the second time threshold.

Figure 4:
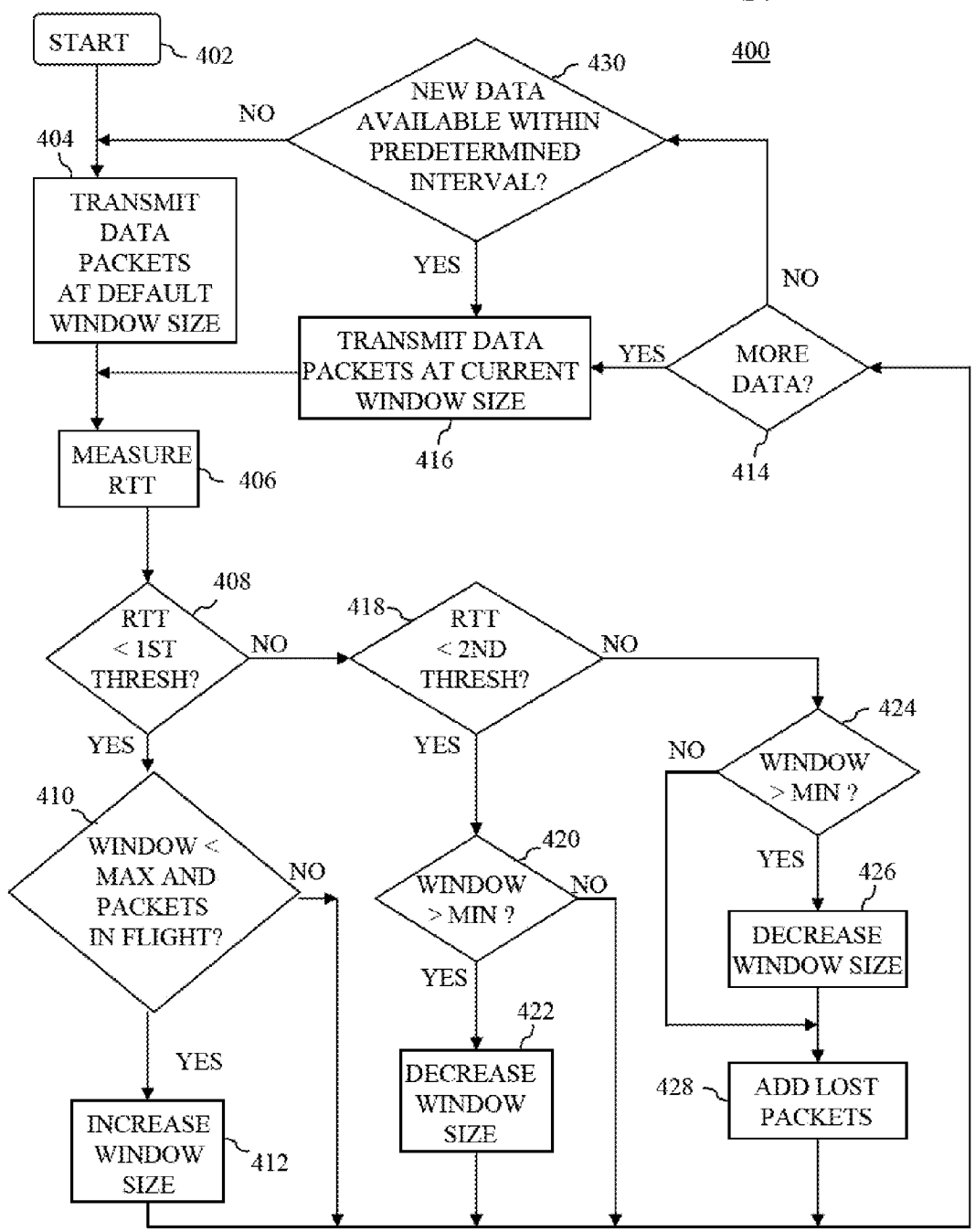
FIG. 4 is an exemplary flowchart illustrating the process of the adaptive window for data packet transmissions between the wireless router system and the mobile device in accordance with at least one of the preferred embodiments.

FIG. 4 is an exemplary flowchart 400 illustrating the process of the adaptive window for data packet transmissions between the wireless router system 102 and the mobile device 120 in accordance with at least one of the preferred embodiments. The process begins in block 402 and the number of data packets matched for the default window size, which is also the minimum window size, is transmitted from the wireless router system 102 to the mobile device 120 in block 404. In block 406, a round trip time (RTT) of each of the transmitted data packets is measured. The mobile device 120 may transmit an acknowledgment signal for every packet received individually. Alternatively, if the mobile device 120 supports optimized acknowledgments, then it does not transmit an acknowledgment signal for each packet, but instead, transmits an acknowledgment signal upon receiving a set of data packets or upon expiration of a predetermined time period if incomplete set of data packets are received. The wireless router system 102 measures the round trip time as the time period between the transmission of the data packet and the receipt of the corresponding acknowledgment signal. The round trip time is indicative of the overall network traffic condition.

If the round trip time is determined to be within the first time threshold for the data packets transmitted within the current window in block 408, indicating the network traffic condition is good, whether the current window size can be increased is checked in block 410. If the current window size is less than the maximum window size and data packets filing the current window size are in flight, then the window size is increased by one data packet in block 412. If the current window size is already at the maximum size, the window size is unchanged. If there are more data to be transmitted in block 414, then the number of data packets matching the window size is transmitted in block 416. The process then repeats from block 406.

If the round trip time for the data packets is determined to be greater than the first time threshold in block 408, then whether the round trip time is within the second time threshold is determined in block 418. If the round trip time is within the second time threshold, but is greater than the first time threshold, then whether the current window size can be decreased is checked in block 420. If the current window size is greater than the minimum window size, then the window size is decreased by one data packet in block 422. If the current window size is already at the minimum size, then the window size is unchanged. If there are more data to be transmitted in block 414, then the number of data packets matching the window size is transmitted in block 416. The process then repeats from block 406.

If the round trip time for the data packets is determined to be greater than the second time threshold in block 418, then the data packets associated with the round trip time greater than the second time threshold are considered to be lost. Whether the current window size can be decreased is checked in block 424. If the current window size is greater than the minimum window size, then the window size is decreased by one data packet in block 426. If the current window size is already at the minimum size, then the window size is unchanged. The lost data packets are prepared to be re-transmitted in block 428, and whether there are more data to be transmitted in addition to the lost packets is checked in block 414. Then the number of data packets, including lost packets, matching the window size is transmitted in block 416. The process then repeats from block 406.

If new data packets become available after the initial data is exhausted in block 414, the timing of the availability of the new data packets is evaluated in block 430. If the new data packets have become available within a predetermined interval after the initial data is exhausted in block 414, then these new data packets are first transmitted using the last-used window size in block 416. If the new data packets have become available after the predetermined interval, then these new data packets are first transmitted using the default window size in block 404.

As described above, the window size may be increased or decreased by a single data packet (incrementing/decrementing) when appropriate. In variations of the technique, however, the window size may be increased or decreased with use of a predetermined algorithm different from such incrementing/decrementing (i.e. one where the window size is changed at a faster rate than incrementing/decrementing). The predetermined algorithm may be utilized for all such increases and decreases in the window size, or utilized only during or in response to the identification of predetermined events or conditions related to mobile device traffic. The window size adjustment according to the predetermined algorithm may be based on, for example, a current round trip time of communications or an elapsed time since previous successful communications have occurred. As another example, the window size adjustment according to the predetermined algorithm may provide for a doubling of the current window size for each increase in window size.

A few specific variations which may utilize such predetermined algorithm are now discussed. As described above in relation to FIGS. 2-4, a last-used window size may be used for transmitting if more data packets become available for transmitting to the mobile device within a predetermined interval, after previous data packets are exhausted, but a default (minimum) window size for transmitting may be used if more data packets become available for transmitting to the mobile device after the predetermined interval. In a first variation of this technique, after the first use of the default window size, what may immediately follow is the use of window size adjustments based on incrementing/decrementing by one data packet. In a second variation of the technique, after this first use of the default window size, what may immediately follow is the use of the last-used window size for transmitting if any of the more data packets are successfully delivered. In a third variation of the technique, after this first use of the default window size, what may immediately follow is the use of the predetermined algorithm (e.g. see specific examples above) where the window size is changed at a faster rate than incrementing/decrementing if any of the more data packets are successfully delivered. Other variations are possible as well.

Also as described above in relation to FIGS. 2-4, the wireless router system utilizes first and second time thresholds for determining adjustments to the window size. Preferably, the first and the second time thresholds are initialized and set based on traffic conditions of a plurality of mobile communication devices (e.g. all of the mobile communication devices) operating in the wireless communication network through the wireless router system (i.e. not only the single mobile device with which communications are taking place). For example, the first and the second time thresholds may be initialized and set based on a round trip time value derived based on round trip times for traffic associated with all of the mobile communication devices operating in the wireless communication network through the wireless router system. This round trip time value may be based on an average of all of the round trip times for the mobile communication devices over a period of time. Most preferably, the wireless router system operates to regularly or periodically derive the round trip time value based on the round trip times for the traffic and dynamically update the first and the second time thresholds per on-going operation.

Figure 5:
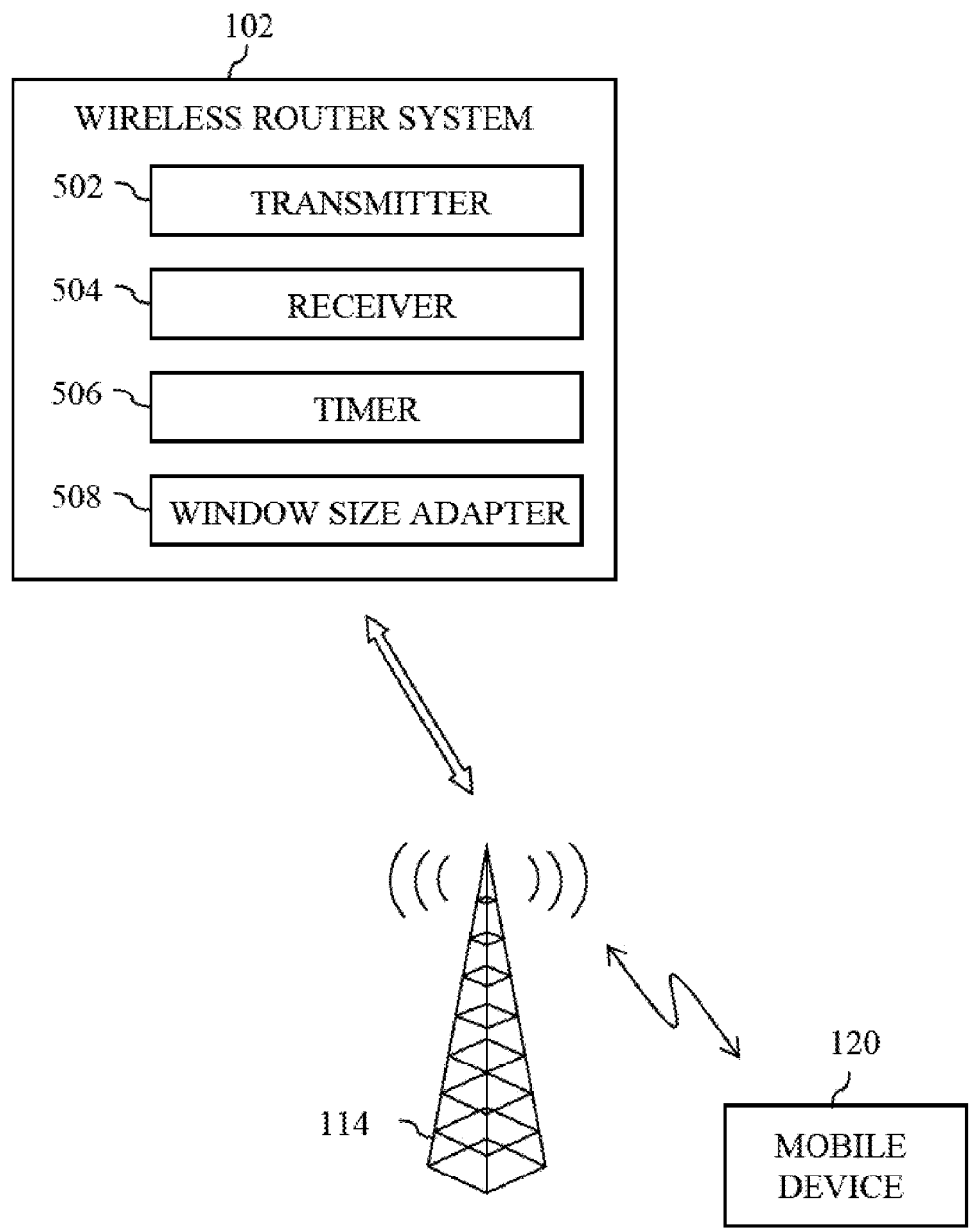
FIG. 5 is an exemplary block diagram of a wireless router system configured to dynamically adjust a window size for data packet transmission to a wireless mobile communication device through a wireless communication network.

FIG. 5 is an exemplary block diagram of a wireless router system 102 configured to dynamically adjust a window size for data packet transmission to a wireless mobile communication device 120 through a wireless communication network 114. The wireless router system 102 has a transmitter 502 configured to transmit a number of data packets matched for a window size, and a receiver 504 configured to receive an acknowledgment signal associated with the number of data packets. The mobile device 120 may transmit an acknowledgment signal for every packet received individually. If the mobile device 120 supports optimized acknowledgments, it does not transmit an acknowledgment signal for each packet, but instead, transmits an acknowledgment signal upon receiving a set of data packets or upon expiration of a predetermined time period if incomplete set of data packets are received. The wireless router system 102 has a timer 506, which is coupled to the transmitter 502 and the receiver 504. The timer 506 is configured to measure the round trip time associated with the number of data packets, and measures the round trip time as the time period between the transmission of the data packets and the receipt of the acknowledgment signal. The round trip time is indicative of the overall network traffic condition.

The wireless router system also has a window size adapter 508, which is coupled to the timer 506 and the transmitter 502, and is configured to adapt the window size based upon the round trip time. The window size adapter 508 is configured to increase the window size if the round trip time is within a first time threshold and to decrease the window size if the round trip time is more than the first time threshold. The window size adapter 508 is configured to change the window size by a predetermined increment, such as one data packet, and to increase the window size up to a predetermined maximum size and to decrease down to a predetermined minimum size. The window size adapter 508 is further configured to use a previous window size if more data packets become available within a predetermined interval after the previous data packets are exhausted. If more data become available after the predetermined interval, the window size adapter 508 uses a default window size.

Instead of potentially waiting for the acknowledgment signal for a long time, the timer 506 is further configured to equate the round trip time to be more than a second time threshold if the receiver 504 fails to receive the acknowledgment signal within the second time threshold. The data packets having the round trip time of more than the second time threshold are considered to be lost and are re-transmitted by the transmitter 502.

As apparent, the present techniques advantageously utilize what is referred to as an "in-flight" window (rather than a sliding window which may be utilized in some TCP communications) suitable for the present wireless environment and data applications. A sliding window approach of the prior art is useful where a stream of data is being communicated, and a first byte needs to be received before a second byte is useful (e.g. a streaming video). The sliding window approach is also useful where a very large file is being communicated and the receiver does not have sufficient memory available to buffer all of the data (e.g. downloading a new program). With a sliding window approach, if the permitted window size is three (3), the sender is permitted to send packets 1, 2, 3. If packet 1 is acknowledged, the sender is permitted to send packet 4. However, if packet 2 is acknowledged before packet 1, the sender is not permitted to send any other following packet until packet 1 is acknowledged.

In accordance with the in-flight window approach of the present disclosure, as long as any one of the packets 1, 2, or 3 is acknowledged, the sender is permitted to send another packet to the match the number of packets "in-flight". In the present environment, several different small independent messages may be sent at the same time, and the mobile device is able receive (and display, for example) a second message before it receives a first message. By using an in-flight window, a more efficient use of the communication channel is utilized, as all other communications are not halted while the first message (for example) is being resent.

An advantage conferred by using a fixed value for the optimal round trip time is that it helps identify the optimal sending rate more quickly, since a large amount of traffic does not have to be sent first in order to calculate a good estimate of the minimum round trip time. The technique is particularly useful when the mobile device is operative to send, over a long period of time, a plurality of relatively short data bursts/messages (e.g. small incremental changes in data for data-synchronized communication with network applications, e-mail messages/data, calendar appointment message/data) with long periods of idle connections between each sending. According to the prior art (e.g. TCP variant), the minimum round trip time would need to be re-learned each time a short message had to be sent. Another advantage of using a fixed value for the optimal round trip time is that more consistent sharing of the bandwidth is gained across different connections.

According to techniques of the prior art (e.g. a TCP variant), when a connection is idle, the sender drops the window size back to one (1) segment as the technique assumes that another device may now be using the network bandwidth. Therefore, the sender is not permitted to quickly start sending data at a fast data rate. In accordance with the present techniques, the previous window size is retained for a predetermined time period (e.g. several minutes, such as between 1 and 10 minutes) and may be returned to more quickly. This technique is driven on the assumption that the limit in bandwidth is the RF over-the-air portion, which has less to do with other traffic (which may change quickly) and more to do with where the mobile device is located (which does not change too quickly).

Thus, methods and apparatus for dynamically adjusting a data packet window size for data packet transmission in a wireless communication network have been described. In one illustrative example, a method in a wireless router system for transmitting data packets to a mobile communication device through the wireless communication network based upon a round trip time associated with communication of each data packet is provided. The round trip time is a time period between the transmission of each data packet and reception of a corresponding acknowledgment signal from the mobile communication device. A number of data packets matched for a window size are transmitted to the mobile communication device, and a round trip time associated with communication of each of the transmitted data packets is measured. The window size for data packet transmission is re-sized by increasing the window size if the round trip time associated with the communication of each of the transmitted data packets is within a first time threshold, and decreasing the window size if the round trip time associated with the communication of any of the transmitted data packets is more than the first time threshold but less than a second time threshold. The window size is also decreased if the round trip time of any of the transmitted data packets is more than the second time threshold, where each such data packet is further marked as a lost data packet. A number of data packets matched for the re-sized window is subsequently transmitted, including a retransmission any data packets marked as lost. The steps of the method are repeated from the measuring step until data packets to be transmitted are exhausted.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a router for use in data packet transmission, the method comprising:
performing the following acts for each one of a plurality of wireless mobile devices operating in a wireless communication network:
initially transmitting, to the wireless mobile device via the router, a number of data packets matched for a window size which corresponds to a default window size;
measuring a round trip time associated with communication of each of the transmitted data packets, the round trip time being a time period between the transmission of each data packet and reception of a corresponding acknowledgment signal from the wireless mobile device;
increasing the window size if the round trip time associated with the communication of each of the transmitted data packets is within a first time threshold;
decreasing the window size if the round trip time associated with the communication of any of the transmitted data packets is more than the first time threshold but less than a second time threshold;
additionally transmitting, to the wireless mobile device via the router, a number of data packets matched for the re-sized window; and
setting or updating at least one of the first or the second time thresholds based on traffic communicated to the plurality of wireless mobile devices via the router.

2. The method of claim 1, further comprising:
repeating, for a plurality of new data packets, the above steps of initially transmitting, measuring, increasing or decreasing, and additionally transmitting; and
wherein the increasing or decreasing is performed based on at least the first or the second threshold that is set based on the traffic communicated to the plurality of wireless mobile devices via the router.

3. The method of claim 1, wherein the setting or updating the at least one of the first or the second time thresholds comprises regularly updating at least one of the first or the second time thresholds based on the traffic communicated to the plurality of wireless mobile devices via the router.

4. The method of claim 1, wherein the setting or updating of the at least one of the first or the second time thresholds further comprises:
deriving a round trip time value based on the round trip times of data packets communicated to the plurality of the wireless mobile devices via the router; and
setting or updating at least one of the first or the second time thresholds based on the derived round trip time value.

5. The method of claim 1, wherein the setting or updating of the at least one of the first or the second time thresholds further comprises:
deriving a round trip time value based on an average of the round trip times of data packets communicated to the plurality of the wireless mobile devices via the router; and
setting or updating at least one of the first or the second time thresholds based on the derived round trip time value.

6. The method of claim 1, wherein the setting or updating of the at least one of the first or the second time thresholds further comprises:
deriving a round trip time value based on an average of the round trip times of data packets communicated to the plurality of the wireless mobile devices via the router; and
regularly updating at least one of the first or the second time thresholds based on the derived round trip time value per on-going operation.

7. The method of claim 1, further comprising:
if the round trip time associated with the communication of any of the transmitted data packets is more than the second time threshold, then decreasing the window size and marking each data packet having the round trip time more than the second time threshold as a lost data packet.

8. The method of claim 1, further comprising:
if the round trip time associated with the communication of any of the transmitted data packets is more than the second time threshold, then decreasing the window size and marking each data packet having the round trip time more than the second time threshold as a lost data packet; and
wherein the additionally transmitting of the number of data packets matched for the re-sized window includes retransmitting any data packets marked as lost.

9. The method of claim 1, further comprising:
for a new set of data associated with a plurality of new data packets to be transmitted, to the wireless mobile device via the wireless network, after the previous data packets have been exhausted:
if the new data packets become available within a predetermined interval after the previous data packets have been exhausted, then repeating for the new data packets the above steps of initially transmitting, measuring, increasing or decreasing, and additionally transmitting, where the initial transmission of the number of new data packets is matched for a window size which corresponds to a last-used window size which is greater than the default window size; and
otherwise, if the new data packets become available after the predetermined interval, then repeating for the new data packets the above steps of initially transmitting, measuring, increasing or decreasing, and additionally transmitting, where the initial transmission of the number of new data packets is matched for a window size which corresponds to the default window size.

10. The method of claim 1, wherein the measuring the round trip time of each of the transmitted data packets includes:
identifying the round trip time of a data packet to be more than the second time threshold upon failing to receive a corresponding acknowledgment signal within the second time threshold.

11. A router, comprising:
a receiver;
a transmitter;
a timer;
a window size adapter;
the router being configured to perform the following actions for each one of a plurality of wireless mobile devices operating in a wireless communication network:
initially transmit, to the wireless mobile device via the transmitter, a number of data packets matched for a window size which corresponds to a default window size;
measure, with use of the timer, a round trip time associated with communication of each of the transmitted data packets, the round trip time being a time period between the transmission of each data packet and reception of a corresponding acknowledgment signal from the wireless mobile device via the receiver;
increase the window size if the round trip time associated with the communication of each of the transmitted data packets is within a first time threshold;
decrease the window size if the round trip time associated with the communication of any of the transmitted data packets is more than the first time threshold but less than a second time threshold;
additionally transmit, to the wireless mobile device via the transmitter, a number of data packets matched for the re-sized window; and
set or update at least one of the first or the second time thresholds based on traffic communicated to the plurality of wireless mobile devices in the wireless network via the transmitter.

12. The router of claim 11, which is further configured to:
repeat, for a plurality of new data packets, the above steps of initially transmitting, measuring, increasing or decreasing, and additionally transmitting; and
wherein the increasing or the decreasing is performed based on at least the first or the second threshold that is set based on the traffic communicated to the plurality of wireless mobile devices via the router.

13. The router of claim 11, which is further configured to set or update the at least one of the first or the second time thresholds by regularly updating at least one of the first or the second time thresholds based on the traffic communicated to the plurality of wireless mobile devices via the router.

14. The router of claim 11, which is further configured to set or update at least one of the first or the second time thresholds by:
deriving a round trip time value based on the round trip times of data packets communicated to the plurality of the wireless mobile devices via the router; and
setting or updating at least one of the first or the second time thresholds based on the derived round trip time value.

15. The router of claim 11, which is further configured to set or update at least one of the first or the second time thresholds by:
deriving a round trip time value based on an average of the round trip times of data packets communicated to the plurality of the wireless mobile devices via the router; and
setting or updating at least one of the first or the second time thresholds based on the derived round trip time value.

16. The router of claim 11, which is further configured to set or update at least one of the first or the second time thresholds by:
deriving a round trip time value based on an average of the round trip times of data packets communicated to the plurality of the wireless mobile devices via the router; and
regularly updating at least one of the first or the second time thresholds based on the derived round trip time value per on-going operation.

17. The router of claim 11, which is further configured to:
if the round trip time associated with the communication of any of the transmitted data packets is more than the second time threshold, then decrease the window size and marking each data packet having the round trip time more than the second time threshold as a lost data packet.

18. The router of claim 11, which is further configured to:
if the round trip time associated with the communication of any of the transmitted data packets is more than the second time threshold, then decrease the window size and marking each data packet having the round trip time more than the second time threshold as a lost data packet; and
wherein the additional transmitting if the number of data packets matched for the re-sized window includes retransmitting any data packets marked as lost.

19. A computer program product, comprising:
a non-transitory computer readable medium;
computer instructions stored in the non-transitory computer readable medium;

the computer instructions being executed by one or more processors for use in transmitting, to a wireless mobile communication device through a wireless communication network, a plurality of data packets by performing the following acts for each one of a plurality of wireless mobile devices operating in the wireless network:

initially transmitting, to the wireless mobile device via the router, a number of data packets matched for a window size which corresponds to a default window size;

measuring a round trip time associated with communication of each of the transmitted data packets, the round trip time being a time period between the transmission of each data packet and reception of a corresponding acknowledgment signal from the wireless mobile device;

increasing the window size if the round trip time associated with the communication of each of the transmitted data packets is within a first time threshold;

decreasing the window size if the round trip time associated with the communication of any of the transmitted data packets is more than the first time threshold but less than a second time threshold;

additionally transmitting, to the wireless mobile device via the wireless network, a number of data packets matched for the re-sized window; and setting or updating at least one of the first or the second time thresholds based on traffic communicated to the plurality of wireless mobile devices via the router.

20. The computer program product of claim 19, wherein the computer instructions are further executable to set or update the at least one of the first or the second time thresholds by regularly updating at least one of the first or the second time thresholds based on the traffic communicated to the plurality of wireless mobile devices via the router.

21. The computer program product of claim 19, wherein the computer instructions are further executable to set or update at least one of the first or the second time thresholds by:

deriving a round trip time value based on the round trip times of data packets communicated to the plurality of the wireless mobile devices via the router; and setting or updating at least one of the first or the second time thresholds based on the derived round trip time value.

22. The computer program product of claim 19, wherein the computer instructions are further executable to update at least one of the first or the second time thresholds by:

deriving a round trip time value based on an average of the round trip times of data packets communicated to the plurality of the wireless mobile devices via the router; and setting or updating at least one of the first or the second time thresholds based on the derived round trip time value.

23. The computer program product of claim 19, wherein the computer instructions are further executable to set or update at least one of the first or the second time thresholds by:

deriving a round trip time value based on an average of the round trip times of data packets communicated to the plurality of the wireless mobile devices via the router; and regularly updating at least one of the first or the second time thresholds based on the derived round trip time value per on-going operation.

24. The method of claim 1, wherein the setting or updating comprises the step of updating the first time threshold based on the traffic communicated to the plurality of wireless mobile devices via the router.

25. The method of claim 1, wherein the setting or updating comprises the step of updating the second time threshold based on the traffic communicated to the plurality of wireless mobile devices via the router.

26. The router of claim 11, which is further configured to set or update the at least one of the first or the second time thresholds by updating the first time threshold based on the traffic communicated to the plurality of wireless mobile devices via the router.

27. The router of claim 11, which is further configured to set or update the at least one of the first or the second time thresholds by updating the second time threshold based on the traffic communicated to the plurality of wireless mobile devices via the router.

* * * * *